Patented Mar. 30, 1954

2,673,866

UNITED STATES PATENT OFFICE 2,673,866

14α,17α,21-TRIHYDROXY-4-PREGNENE-3,20-DIONE AND ESTERS THEREOF

Herbert C. Murray, Hickory Corners, and Durey H. Peterson, Kalamazoo, Mich., assignors to The Upjohn Company, Kalamazoo, Mich., a corporation of Michigan No Drawing. Application July 1, 1952, Serial No. 296,732

7 Claims. (Cl. 260—397.45)

This invention relates to novel steroids and a process for their production. More particularly it relates to 14α,17α,21-trihydroxy-4-pregnene-3,20-dione and esters thereof. An object of this invention is to obtain 14α,17α,21-trihydroxy-4-pregnene-3,20-dione and esters thereof having pharmaceutical and chemical utility.

This application is a continuation-in-part of our applications Serial Number 272,944, filed February 23, 1952, now Patent 2,602,769, issued July 8, 1952, and Serial Number 291,791, filed June 4, 1952, now abandoned.

The novel compounds of the present invention may be represented by the following structural formula:

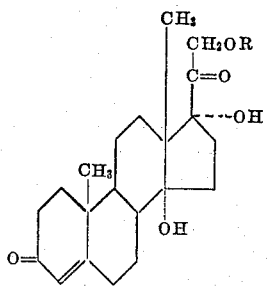

wherein R is hydrogen or the acid radical of a carboxylic acid containing from one to eight carbon atoms inclusively and selected from the group consisting of aliphatic acids and carbocyclic acids.

The following examples are illustrative of the processes and products of this invention and are not to be construed as limiting.

*Example 1.—14α,17α,21 - trihydroxy-4-pregnene-3,20-dione*

A medium was prepared of twenty grams of edamine enzymatic digest of lactalbumin, three grams of corn steep liquor and fifty grams of technical dextrose diluted to one liter with tap water and adjusted with sodium hydroxide to a pH of 4.3 to 4.5. Twelve liters of this sterilized medium was inoculated with spores of Helicostylum piriforme, American Type Culture Collection Number 8992, and incubated for 24 hours at a temperature of 28 degrees centigrade using a rate of aeration and stirring such that the oxygen uptake was 6.3 to 7 millimoles per hour per liter of $Na_2SO_3$ according to the method of Cooper, Fernstrom and Miller, Ind. Eng. Chem., 36, 504 (1944). To this medium containing a 24 hour growth of Helicostylum piriforme was added two grams of compound S, 17α,21-dihydroxy-4-pregnene-3,20-dione, in a minimum of ethanol to provide a suspension of the steroid in the culture. After an additional 24-hour period of incubation under the same conditions of temperature and aeration, the beer and mycelium were extracted. The mycelium was filtered, washed twice, each time with a volume of acetone approximately equal to the volume of the mycelium, and extracted twice, each time with a volume of methylene chloride approximately equal to the volume of the mycelium. The acetone and methylene chloride extracts including solvent were added to the beer filtrate. The mixed extracts and beer filtrate were extracted successively with two one-half by volume portions of methylene chloride and then with two one-fourth by volume portions of methylene chloride. The combined methylene chloride extracts were washed with two one-tenth by volume portions of a two percent aqueous solution of sodium bicarbonate and then with two one-tenth by volume portions of water. After drying the methylene chloride extracts with about three to five grams of anhydrous sodium sulfate per liter of solvent and filtering, the solvent was removed by distillation. The residue was dissolved in a minimum of methylene chloride, filtered and the solvent then evaporated. The resulting crude crystals were dried and then washed five times with five-milliliter portions of ether per gram of crude crystals, yielding 5.354 grams of residue. The residue was dissolved in ten milliliters of ethylene dichloride and chromatographed over 350 grams of Florisil synthetic magnesium silicate using 550-milliliter portions of developing solvent fractions as indicated in the table.

TABLE

*Helicostylum piriforme*

| Fraction | Solvent | Eluate Solids, Milligrams |
|---|---|---|
| 1 | ethylene dichloride | 479.5 |
| 2 | do | 403.0 |
| 3 | ethylene dichloride-acetone, 15:1 | 815.5 |
| 4 | do | 36.5 |
| 5 | ethylene dichloride-acetone, 12:1 | 36.0 |
| 6 | do | 50.0 |
| 7 | do | 109.5 |
| 8 | ethylene dichloride-acetone, 10:1 | 159.0 |
| 9 | do | 148.0 |
| 10 | ethylene dichloride-acetone, 8:1 | 145.0 |
| 11 | do | 104.5 |
| 12 | do | 98.0 |
| 13 | ethylene dichloride-acetone, 5:1 | 170.0 |
| 14 | do | 123.0 |
| 15 | do | 123.5 |
| 16 | ethylene dichloride-acetone, 3:1 | 127.5 |
| 17 | do | 200.0 |
| 18 | ethylene dichloride-acetone, 1:1 | 456.0 |
| 19 | do | 356.0 |
| 20 | acetone | 226.5 |

Eluate fractions 13 through 16, inclusive, freed of solvent, were recrystallized from ten milliliters of ether by slowly evaporating the ether at room temperature. This crystallization produced 228.6 milligrams of crystals, melting point 218 to 226 degrees centigrade. Two more recrystallizations, each time from ten milliliters of ether-acetone, one to one proportion, gave crystals of melting point 232 to 235 degrees centigrade. Recrystallization of a sample of this, 57 milligrams, from five milliliters of methanol produced 14α,17α,21-trihydroxy-4-pregnene-3,20-dione, melting point 234 to 237 degrees centigrade, $[\alpha]_D^{23}$ of plus 155 degrees (1.13 in methanol) having a unique infrared spectrum.

Analysis: Calculated for $C_{21}H_{30}O_5$: C, 69.58; H, 8.34. Found: C, 69.42; H, 8.40.

In the novel process for the production of esters of 14α,17α,21-trihydroxy-4-pregnene-3,20-dione the starting 14α,17α,21-trihydroxy-4-pregnene-3,20-dione is admixed with an acylating agent such as, for example, ketene, a ketene of a selected acid, an acid, acid chloride or acid anhydride, or other known acylating agent, usually in a solvent such as, for example, pyridine or the like, or an inert solvent, including solvents like benzene, toluene, ether, and the like, for example, and heated at a temperature between about zero degrees centigrade and the boiling point of the reaction mixture, usually about room temperature, for a period between about a half hour and about 96 hours. The time of reaction as well as the temperature at which the reaction is carried out, the acylating agent, and the ratio of reactants may be varied. The reaction mixture is suitably poured into ice or cold water, the product collected in an appropriate solvent which is thereafter washed with successive portions of a mildly basic solution and water to obtain a solution which is essentially neutral.

In some instances, the product may crystallize from the reaction mixture, in which case it may be advantageous to separate the product by conventional means such as, for example, by recrystallization from a suitable solvent or by chromatographic purification, as deemed necessary.

*Example 2.—21-acetoxy-14α,17α-dihydroxy-4-pregnene-3,20-dione*

A suspension of 44.2 milligrams of 14α,17α,21-trihydroxy-4-pregnene-3,20-dione in 2.5 milliliters of acetic anhydride and two milliliters of absolute pyridine, was heated on a steam bath to cause complete solution. After eighteen hours at room temperature, the mixture was quenched with thirty milliliters of ice water. The mixture was extracted three times with twenty milliliters of ether-chloroform, five to one ratio. The extracts were washed twice with ten milliliters of five percent hydrochloric acid, once with water, three times with five percent sodium bicarbonate and three times with water. Upon drying over anhydrous sodium sulfate, filtering and evaporating the solvents, a crystalline residue weighing 61.5 milligrams was obtained. Recrystallization twice, each time from five milliliters of acetone, produced 36 milligrams of 21-acetoxy-14α,17α-dihydroxy-4-pregnene-3,20-dione, melting point 232 to 235 degrees centigrade, $[\alpha]_D^{22}$ of plus 167 degrees (0.591 in chloroform). Structure was verified by infrared spectrum.

Analysis: Calculated for $C_{23}H_{32}O_6$: C, 68.29; H, 7.98. Found: C, 68.19; H, 8.07.

*Example 3.—21-propionyloxy-14α,17α-dihydroxy-4-pregnene-3,20-dione*

Following the procedure of Example 2, using the equivalent proportion of propionic anhydride in place of acetic anhydride and separating by chromatography produced 21-propionyloxy-14α,17α-dihydroxy-4-pregnene-3,20-dione.

*Example 4.—21-trimethylacetoxy-14α,17α-dihydroxy-4-pregnene-3,20-dione*

To one gram of 14α,17α,21-trihydroxy-4-pregnene-3,20-dione dissolved in ten milliliters of freshly distilled pyridine was added dropwise 300 milligrams of trimethylacetyl chloride. The reaction mixture was maintained at room temperature for 24 hours and then quenched with 150 milliliters of ice-cold water. Extraction and chromatographic separation, as in Example 2, produced 21-trimethylacetoxy-14α,17α-dihydroxy-4-pregnene-3,20-dione.

*Example 5.—21-β-cyclopentylpropionyloxy-14α,17α-dihydroxy-4-pregnene-3,20-dione*

Following the procedure of Example 4, using the equivalent of β-cyclopentylpropionyl chloride in place of trimethylacetyl chloride produced 21-β-cyclopentylpropionyloxy-14α,17α-dihydroxy-4-pregnene-3,20-dione.

*Example 6.—21-benzoxy-14α,17α-dihydroxy-4-pregnene-3,20-dione*

Following the procedure of Example 4 using the equivalent of benzoyl chloride in place of trimethylacetyl chloride produced 21-benzoxy-14α,17α-dihydroxy-4-pregnene-3,20-dione.

In a similar manner, other esters of 14α,17α,21-trihydroxy-4-pregnene-3,20-dione are prepared according to acylation procedures. Representative esters of 14α,17α,21-trihydroxy-4-pregnene-3,20-dione thus-prepared include one to eight carbon atom carboxylic acid acyloxy esters of saturated or unsaturated, aliphatic, carbocyclic, or cycloaliphatic, aryl, arylalkyl, alkaryl, mono, di or polycarboxylic acids which form ester groups such as, for example, formyloxy, acetoxy, propionyloxy, dimethylacetoxy, trimethylacetoxy, butyryloxy, valeryloxy, hexanoyloxy, heptanoyloxy, octanoyloxy, benzoxy, phenylacetoxy, toluoyloxy, cyclopentylformyloxy, β-cyclopentylpropionyloxy, acrylyloxy, cyclohexylformyloxy, the half and di-esters of malonic, maleic, succinic, glutaric and adipic acids, and the like. The acids may also contain non-interfering substituents, such as mono or polyhalo, chloro, bromo, hydroxy, methoxy, and the like, if desired.

The novel 14α,17α,21-trihydroxy-4-pregnene-3-20-dione and esters of this invention demonstrate marked anesthetic and androgenic activity. These 14α,17α,21-trihydroxy-4-pregnene-3,20-dione 21-esters are also useful as intermediates in the preparation of physiologically active steroids. For example, the 21-acetoxy-14α,17α-dihydroxy-4-pregnene-3,20-dione can be treated with phosphorous oxychloride in pyridine to cause dehydration of the hydroxyl groups and give the unsaturated derivative which on preferential hydrogenation with two molar equivalents of hydrogen over a palladium-charcoal catalyst gives the physiologically active desoxycorticosterone acetate. If desired, the unsaturated derivative can be completely saturated with hydrogen to yield the known 21-acyloxypregnane-3,20-dione which can then be converted to desoxycorticosterone acetate by methods known in the art, i. e., bromination at the 4-position followed by dehydrobromination with pyridine to establish the 4(5) double bond. The 14α,17α,21-trihydroxy-4-pregnene-3,20-dione can be oxidized with chromium trioxide to 14α-hydroxy-4-androstene-3,20-dione melting at 259 to 263 degrees centigrade.

It is to be understood that the invention is not to be limited to the exact details of operation or exact compounds shown and described, as obvious modifications and equivalents will be apparent to one skilled in the art, and the invention is therefore to be limited only by the scope of the appended claims.

We claim:

1. A compound selected from the group consisting of 14α,17α,21-trihydroxy-4-pregnene-3,20-dione and 14α,17α,21-trihydroxy-4-pregnene-3,20-dione esters of hydrocarbon carboxylic acids containing from one to eight carbon atoms inclusively.

2. A 14α,17α,21-trihydroxy-4-pregnene-3,20-dione ester of a hydrocarbon carboxylic acid containing from one to eight carbon atoms inclusively.

3. 21 - acetoxy - 14α,17α - dihydroxy - 4 - pregnene-3,20-dione.

4. 21 - propionyloxy - 14α,17α - dihydroxy - 4 - pregnene-3,20-dione.

5. 21 - trimethylacetoxy - 14α,17α - dihydroxy - 4-pregnene-3,20-dione.

6. 21 - β - cyclopentylpropionyloxy - 14α,17α - dihydroxy-4-pregnene-3,20-dione.

7. 14α,17α,21 - trihydroxy - 4 - pregnene - 3,20-dione.

HERBERT C. MURRAY.
DUREY H. PETERSON.

References Cited in the file of this patent
UNITED STATES PATENTS

| Number | Name | Date |
|---|---|---|
| 2,265,183 | Miescher | Dec. 9, 1941 |
| 2,548,922 | Wagner | Apr. 17, 1950 |